United States Patent
Willis et al.

(10) Patent No.: US 11,119,756 B2
(45) Date of Patent: *Sep. 14, 2021

(54) SYSTEM AND METHOD FOR CONTROLLING UPDATES TO INTERNET-OF-THINGS DEVICES

(71) Applicant: BlackBerry Limited, Waterloo (CA)

(72) Inventors: Edward Snow Willis, Ottawa (CA); David Alan Inglis, Stittsville (CA); Hashim Mohammad Qaderi, Kitchener (CA); Scott Hutchens, Ottawa (CA); Christopher Scott Travers, Ottawa (CA); Conrad Delbert Seaman, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/921,461

(22) Filed: Jul. 6, 2020

(65) Prior Publication Data
US 2020/0334031 A1 Oct. 22, 2020

Related U.S. Application Data

(63) Continuation of application No. 16/054,004, filed on Aug. 3, 2018, now Pat. No. 10,719,309.

(51) Int. Cl.
*G06F 9/44* (2018.01)
*G06F 8/65* (2018.01)
(Continued)

(52) U.S. Cl.
CPC .......... *G06F 8/65* (2013.01); *H04L 12/2814* (2013.01); *H04L 12/2825* (2013.01); *H04L 67/12* (2013.01)

(58) Field of Classification Search
None
See application file for complete search history.

(56) References Cited

U.S. PATENT DOCUMENTS 7,831,967 B2   11/2010   Won et al.
8,561,054 B2   10/2013   Smirnov et al.
(Continued)

OTHER PUBLICATIONS

EPO, Communication pursuant to Article 94(3) EPC relating to EP application No. 19187392.6 dated Oct. 22, 2020.

*Primary Examiner* — Qamrun Nahar
(74) *Attorney, Agent, or Firm* — Rowand LLP

(57) ABSTRACT

A computer system includes a processor, a communications subsystem, and a non-transitory computer-readable storage medium. The computer-readable medium stores instructions that when executed by the processor adapt the computer system to receive an indication of a second device selected, at a first device, for update; send an indication signalling the second device to send state information about the second device; receive state information about the second device; determine, based on the state information, that the second device is ready to perform an update; send, to the first device, an indication that the second device is ready to perform the update; receive, from the first device, an indication to update the second device; and, send a corresponding indication to the second device. The second device is configured to begin updating in response to such an indication without any direct interaction with it. Related methods and computer-readable media are also described.

20 Claims, 5 Drawing Sheets

(51) Int. Cl.
*H04L 12/28* (2006.01)
*H04L 29/08* (2006.01)

(56) References Cited

U.S. PATENT DOCUMENTS

| | | | |
|---|---|---|---|
| 8,997,092 B2 | 3/2015 | Gentile et al. | |
| 2004/0083471 A1 | 4/2004 | Nam et al. | |
| 2005/0039178 A1 | 2/2005 | Marolia et al. | |
| 2007/0192462 A1* | 8/2007 | Bae | H04L 12/2809 709/223 |
| 2008/0040713 A1 | 2/2008 | Subbakrishna et al. | |
| 2008/0301667 A1 | 12/2008 | Rao et al. | |
| 2009/0271507 A1 | 10/2009 | Kodimer | |
| 2009/0300595 A1* | 12/2009 | Moran | G06F 8/65 717/170 |
| 2010/0082559 A1 | 4/2010 | Sumcad et al. | |
| 2013/0311611 A1* | 11/2013 | Shim | H04L 67/10 709/217 |
| 2016/0277195 A1 | 9/2016 | Maeda et al. | |
| 2016/0294614 A1* | 10/2016 | Searle | G06F 8/65 |
| 2017/0300313 A1* | 10/2017 | Gantt, Jr. | G06F 8/65 |

\* cited by examiner

SYSTEM AND METHOD FOR CONTROLLING UPDATES TO INTERNET-OF-THINGS DEVICES

This is a continuation of U.S. application Ser. No. 16/054,004 filed Aug. 3, 2018, the contents of which are incorporated herein by reference.

FIELD

This relates to updating software and, more particularly, to initiating and controlling the application of updates for Internet-of-Things devices.

BACKGROUND

Software updates can be performed for a variety of reasons including, for example, to correct issues or defects or to provide new features or functionality.

In recent years, many conventional devices such as, for example, cars, washing machines, refrigerators, and the like, have been enhanced with the addition of embedded computing devices.

Software, including firmware, included in embedded computing devices may require periodic updates. Currently such updates may be provided by bringing updated software to a device such as by way of portable media. For example, an update may be written to a USB thumb drive using a desktop or laptop computer and then the USB thumb drive may be brought to the device to perform the update. In the case of consumer devices, for example, this can be cumbersome. Moreover, as Internet-of-Things devices continue to become more common, the need to visit and operate/interact with each such device in order to periodically update it becomes increasingly cumbersome. Furthermore, in some cases to apply those updates may require the use of a specialized hardware or even, potentially, the services of a specialized technician may be required.

BRIEF DESCRIPTION OF THE DRAWINGS

Reference will now be made, by way of example, to the accompanying drawings in which.

DETAILED DESCRIPTION OF EXAMPLE EMBODIMENTS

Figure 1:
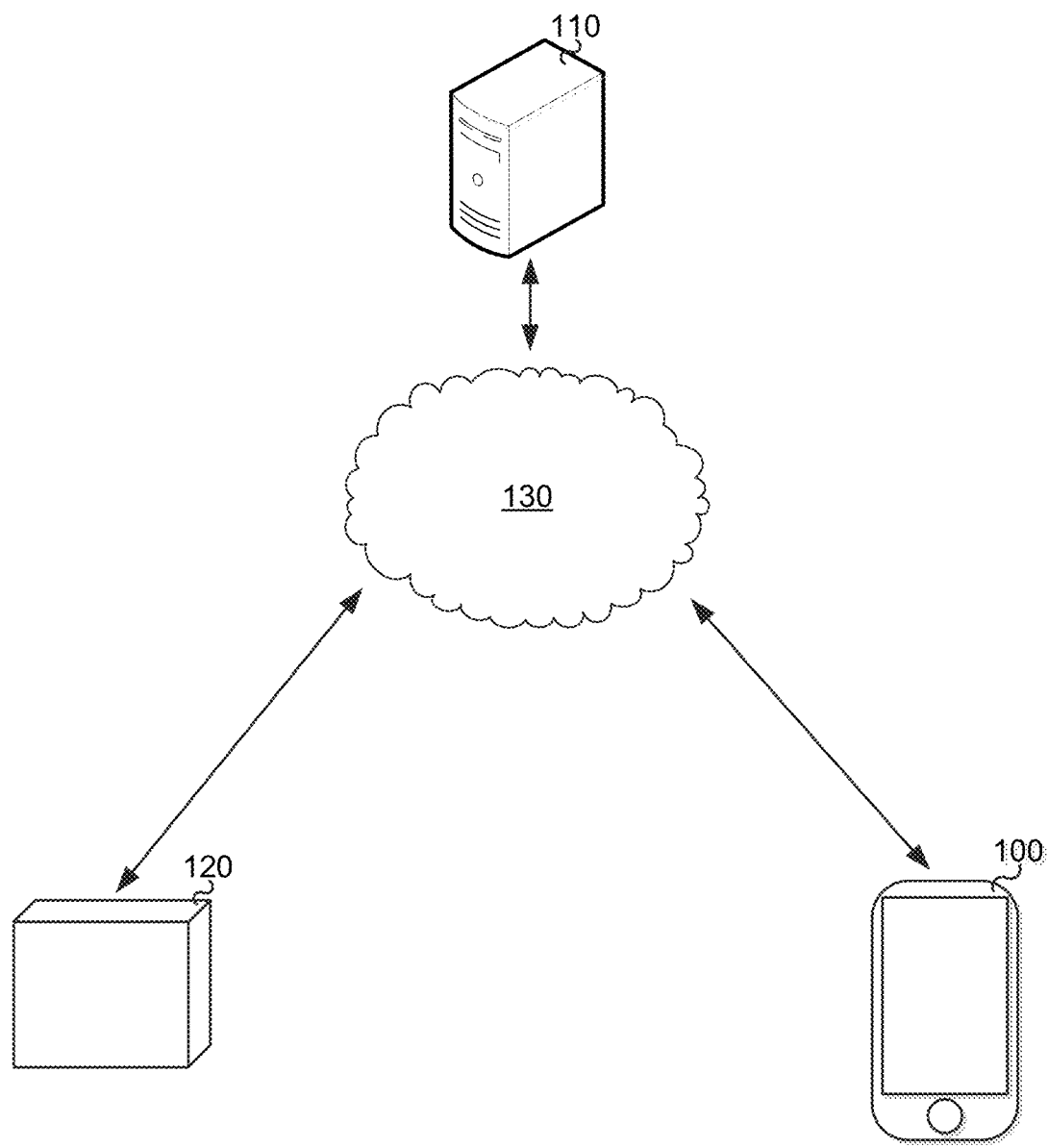
FIG. 1 illustrates a simplified schematic operation diagram illustrating an arrangement of computing devices in the operating environment of an example embodiment.

Internet-of-Things (IoT) devices are devices including enhanced embedded computing devices featuring hardware and software allowing Internet connectivity. IoT devices may provide additional functionality as compared to similar non-IoT device such as, for example, similar devices including embedded computing devices. Additionally or alternatively, IoT devices may serve new or additional purposes not previously addressed by non-IoT devices.

Due to the availability of network connectivity in IoT devices, it is possible to update IoT devices online.

In one aspect, there is provided a computer system. The computer system includes a processor, a communications subsystem, and a non-transitory computer-readable storage medium. The non-transitory computer-readable storage medium stores instructions that when executed by the processor adapt the computer system to: receive, from a first device using the communications subsystem, an indication of a second device selected, at the first device, for update; send, to the second device using the communications subsystem, an indication signalling the second device to send state information about the second device; receive, from the second device using the communications subsystem, the state information about the second device; determine, by the processor based on the state information about the second device, that the second device is ready to perform an update; send, to the first device using the communications subsystem, an indication that the second device is ready to perform an update; receive, from the first device using the communications subsystem, an indication to update the second device; and send, to the second device using the communications subsystem, an indication to begin performing the update, wherein the second device is configured to begin updating responsive to such an indication without any direct interaction with the second device.

In another aspect, there is provided a computer-implemented method. The method includes receiving, at a server from a first device, an indication of a second device selected, at the first device, for update; sending, by the server to the second device, an indication signalling the second device to send state information about the second device to the server; receiving, by the server from the second device, the state information about the second device; determining, by the server based on the received state information about the second device, that the second device is ready to perform an update; sending, by the server to the first device, an indication that the second device is ready to perform the update; receiving, by the server from the first device, an indication to update the second device; and sending, by the server to the second device, an indication to begin performing the update, wherein the second device is configured to begin updating responsive to such an indication without any direct interaction with the second device.

In another aspect, there is provided a non-transitory computer-readable storage medium. The medium stores instructions that when executed by a processor of a computer system adapt the computer system to: receive, from a first device, an indication of a second device selected, at the first device, for update; send, to the second device, an indication signalling the second device to send state information about the second device; receive, from the second device, the state information about the second device; determine, by the processor based on the state information about the second device, that the second device is ready to perform an update; send, to the first device, an indication that the second device is ready to perform the update; receive, from the first device, an indication to update the second device; and send, to the second device, an indication to begin performing the update, wherein the second device is configured to begin updating responsive to such an indication without any direct interaction with the second device.

It may be that a user is only in a position to interact with the user-interface of a device (if any such UI exists) at times when they are intending to use it. For example, a user may only visit their washing machine when they have laundry to be done. In another example, a user may only get in her car if she is intending to take it for a ride. Conveniently, according to various embodiments, a user may initiate updating of a device such as, for example, an IoT device using a device remote from that device.

Additionally or alternatively, it may be that a device (such as an IoT device) is not capable of providing a rich user interface as would allow appropriate review and control of updating. For example, an IoT device may include no or only a small display screen on which information about an update can be reviewed. Additionally or alternatively, it may be that a user would prefer to be able to review such information using a more familiar device such as, for example, at a convenient time or place. Conveniently, according to various embodiments, a user may be able to remotely initiate and control updating of a device such as, for example, an IoT device.

Additionally or alternatively, update of a device may make it unusable for its usual or intended purposes for at least a portion of a period in which the update is being retrieved and applied to the device. Conveniently, according to various embodiments, a user may be able to control when updates are applied to prevent a device being unavailable at an inconvenient time due to an update. For example, a user may be able to control when an update is applied to a washing machine to avoid updating it if they have an urgent wash load. In another example, a user may be able to control an update of their vehicle to avoid updating it if they are planning to take it out to run an errand.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates a simplified schematic operation diagram illustrating an arrangement of computing devices in the operating environment of an example embodiment.

As illustrated, a first device 100, a switchboard server 110, and a second device 120 are in communication via a network 130.

Each of the first device 100, the switchboard server 110, and the second device 120 may be in geographically disparate locations. Put differently, one of the first device 100, the switchboard server 110, and the second device 120 may be remote to others of the first device 100, the switchboard server 110, and the second device 120.

For example, it may be that first device is located in one part of a user's home or business, the second device 120 may be carried by a user from place to place, and the switchboard server 110 may be hosted in a data center.

The first device 100 is or includes a computing device. The first device 100 may, as illustrated, be a smartphone. However, the first device 100 may be a device of another type such as, for example, a personal computer, a laptop computer, a tablet computer, a notebook computer, a handheld computer, a personal digital assistant, a wearable computing device (e.g., a smart watch, a wearable activity monitor, wearable smart jewelry, and glasses and other optical devices that include optical head-mounted displays), or any other type of computing device that may be configured to store data and software instructions, and execute software instructions to perform operations consistent with disclosed embodiments.

The switchboard server 110 is a server computer system adapted for providing services to various client devices including the first device 100 and the second device 120. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). Computer systems may include multiple computing devices organized in a tiered arrangement. For example, a computer system may include middle-tier and back-end computing devices. A computer system may be a cluster formed of a plurality of interoperating computing devices.

The second device 120 includes a computing device. It may be that the second device 120 is an IoT (Internet of Things) device such, for example, a vehicle, an appliance such as, for example, a washing machine or a refrigerator, a smart device, a connected device, a building such as, for example, a home, an Enterprise of Things (EoT) devices (i.e., an IoT device in an enterprise) or a node or combination thereof. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. It may be that the second device 120 is a component of another device.

As further described below, the switchboard server 110 communicates with the first device 100 and the second device 120 to facilitate initiation and control update of the second device 120 as directed by the first device 100.

Figure 2:
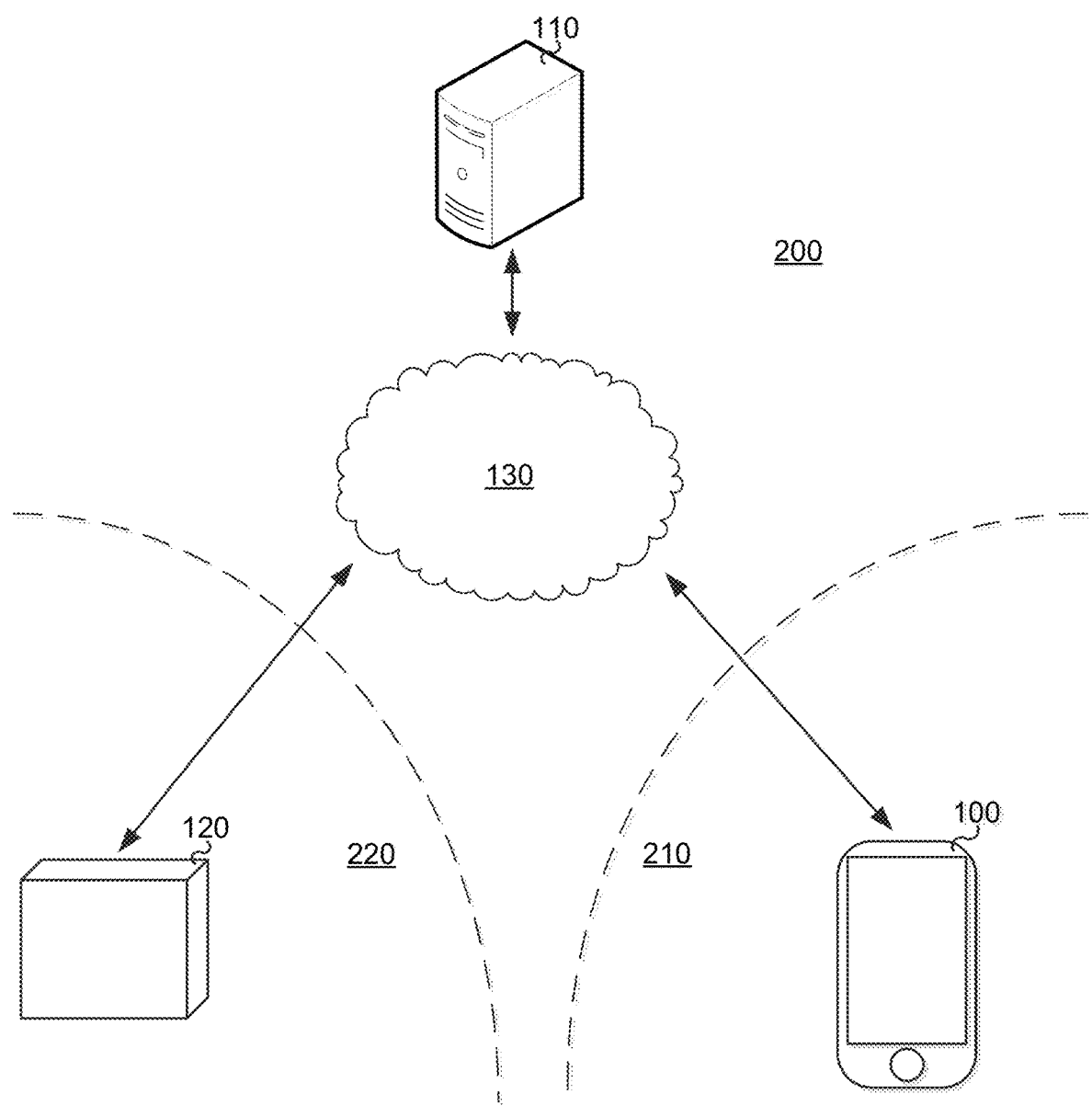
FIG. 2 illustrates another arrangement of the computing devices of FIG. 1.

FIG. 2 illustrates another example arrangement of the computing devices of FIG. 1. In some embodiments, it may be that one or both of the first device 100 and the second device 120 is not directly addressable on the network 130. For example, one or both of the first device 100 and the second device 120 may have an address in a private address space not routable from the network 130. In a particular example, where the network 130 is the Internet, it may be that the Internet Protocol (IP) address(es) assigned to one or both of the first device 100 and the second device 120 is in a private address space. For example, it may, as illustrated, be that the IP address of the switchboard server 110 is a globally addressable IP address in an IP address space 200. By contrast, the IP addresses of the first device 100 and the second device 120 may be private addresses in a private address space 210 and a private address space 220, respectively. For example, this may occur if a device is accessing the address via a router employing network address translation (NAT) techniques. Conveniently, in such a scenario, the switchboard server 110 is reachable/addressable directly by either of the first device 100 and the second device 120. Accordingly, it may be that the first device 100 and the second device 120 communicate via the switchboard server 110, which can act as a relay. Further, as described below, techniques may be employed that take advantage of the fact that the switchboard server 110 is directly addressable in order to facilitate communication between various of the first device 100, the switchboard server 110, and the second device 120.

Figure 3:
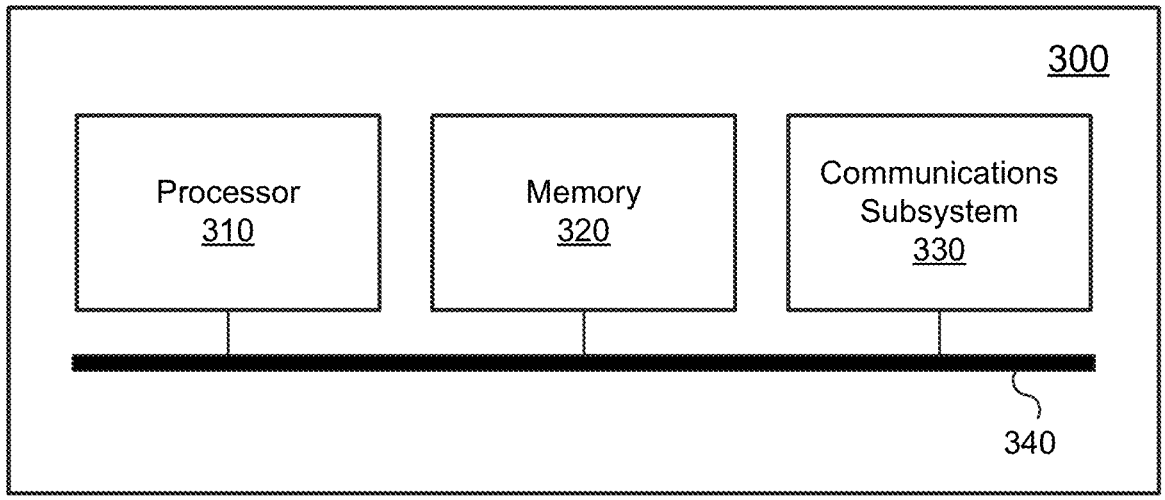
FIG. 3 shows a simplified high-level block diagram of an example computing device.

As noted above, each of the first device 100, the switchboard server 110, and the second device 120 is or may include a computing device. FIG. 3 is a high-level operation diagram of an example computing device 300. Example computing device 300 may be an example of one or more of the switchboard server 110, the first device 100, and the second device 120. As will be discussed in greater detail below, each of the switchboard server 110, the first device 100, and the second device 120 includes software that adapts it to perform a particular function.

The example computing device 300 includes a variety of modules. For example, as illustrated, the example computing device 300 may include a processor 310, a memory 320, and a communications subsystem 330. As illustrated, the foregoing example modules of the example computing device 300 are in communication over a bus 340.

The processor 310 is or includes a hardware processor and may, for example, be or include one or more processors using ARM, x86, MIPS, or PowerPC™ instruction sets. For example, the processor 310 may be or include Intel™ Core™ processors, Qualcomm™ Snapdragon™ processors, or the like.

The memory 320 may include random access memory, read-only memory, persistent storage such as, for example, flash memory, a solid-state drive or the like. Read-only memory and persistent storage are a computer-readable medium. A computer-readable medium may be organized using a file system such as may be administered by an operating system governing overall operation of the example computing device 300.

The communications subsystem 330 allows the example computing device 300 to communicate with other computing devices and/or various communications networks. For example, the communications subsystem 330 may allow the example computing device 300 to send or receive communications signals. Communications signals may be sent or received according to one or more protocols or according to one or more standards. For example, the communications subsystem 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications subsystem 330 may allow the example computing device 300 to communicate via Wi-Fi™, using Bluetooth™ or via some combination of one or more networks or protocols. All or a portion of the communications subsystem 330 may be integrated into a component of the example computing device 300. For example, the communications subsystem may be integrated into a communications chipset.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
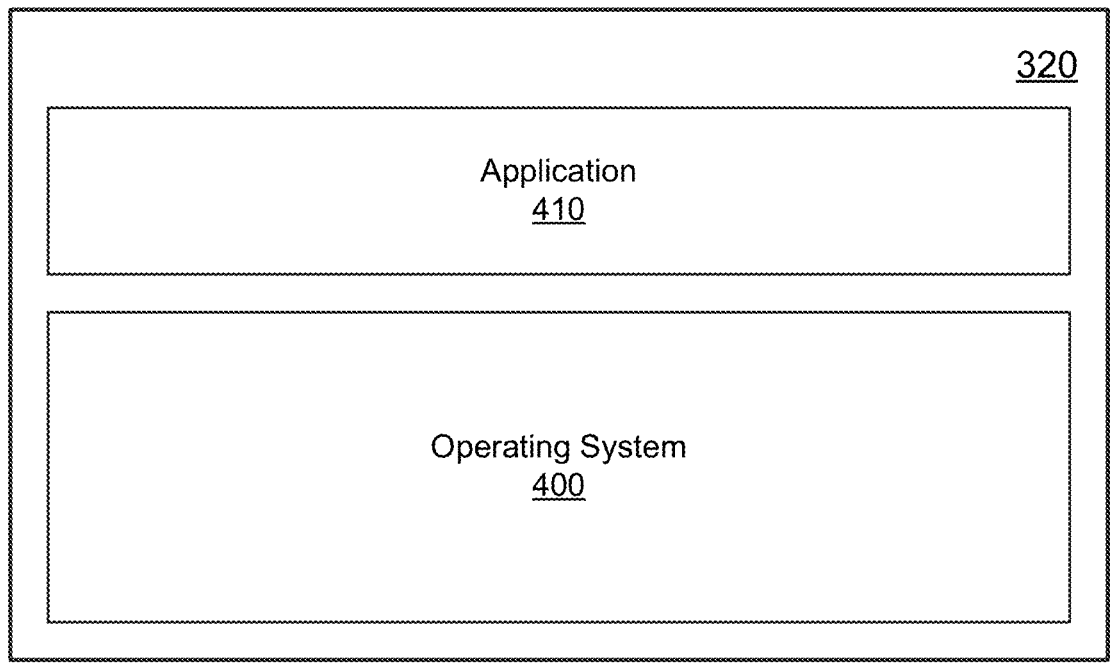
FIG. 4 depicts a simplified software organization of the example computing device of FIG. 3.

FIG. 4 depicts a simplified organization of software components stored in the memory 320 of the example computing device 300. As illustrated these software components include an operating system 400 and an application 410.

The operating system 400 comprises software and may comprise, for example, software such as, for example, Android™, QNX™, Linux™, Apple™ iOS™, Microsoft™ Windows™, or the like. The operating system 400 controls the overall operation of the example computing device 300 and allows the application 410 to access the processor 310, the memory 320, and the communications subsystem 330.

The application 410, comprises software that, in combination with the operating system 400, adapts the example computing device 300 to operate as a device for various purposes. For example, the application 410 may cooperate with the operating system 400 to adapt a suitable instance of the example computing device 300 to operate as the switchboard server 110, the first device 100, or the second device 120.

Figure 5:
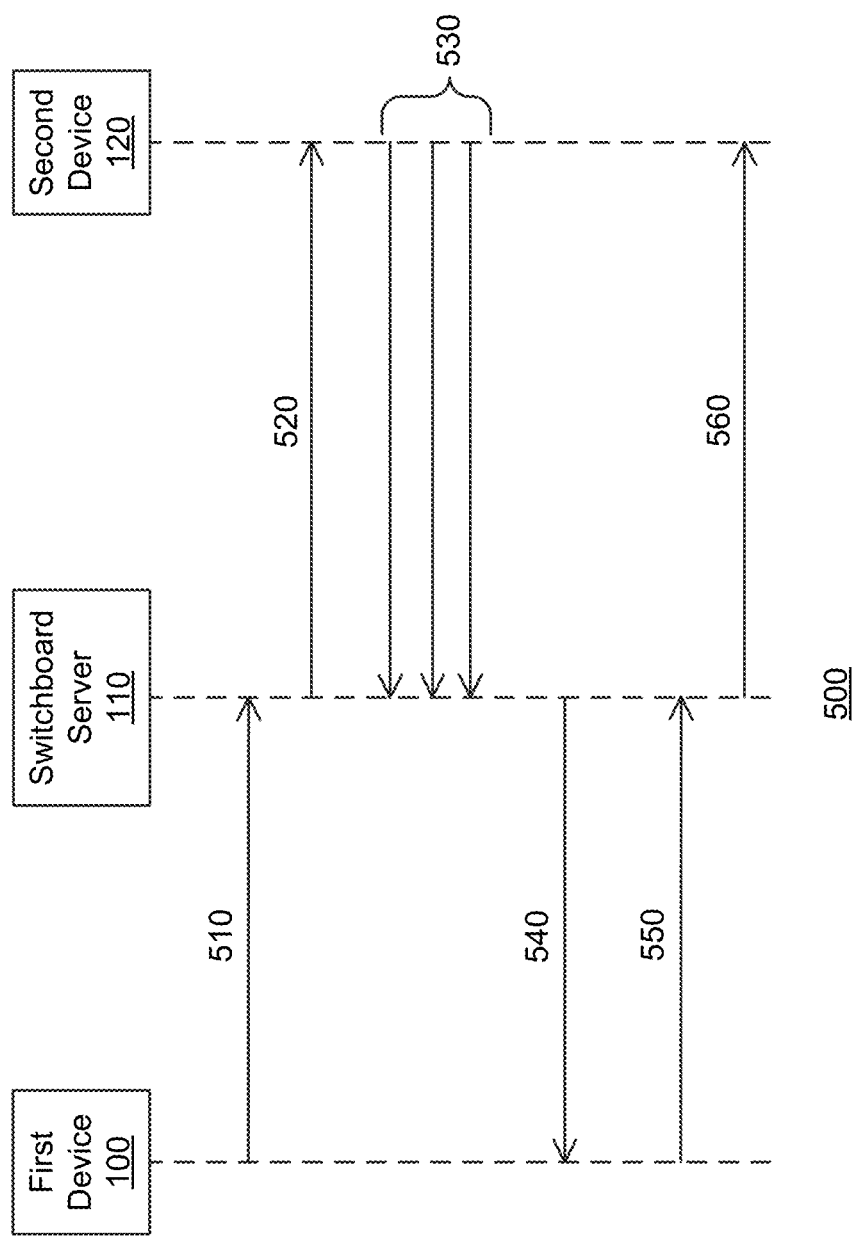
FIG. 5 is a diagram illustrating communications between the computing devices of FIG. 1.

Referring to FIG. 5, the operation of each of the switchboard server 110, the first device 100, and the second device 120 will be described.

FIG. 5 illustrates a sequence diagram 500, similar to a Unified Modelling Language (UML) sequence diagram, that shows how the first device 100, the switchboard server 110, and the second device 120 may communicate. In particular, the sequence diagram 500 depicts messages exchanged between the first device 100, the switchboard server 110, and the second device 120 in initiating and controlling update of the second device 120.

In the following description of the sequence diagram 500, discussion is made of various messages being sent and received via a computer network such as, for example, network 130. The exchanged messages may be implemented as messages. However, it may be that some or all of the illustrated messages may not correspond to messages per se when sent over the computer network but may instead be implemented using techniques such as for example remote procedure calls (RPC) and/or web services application program interfaces (APIs).

The sequence diagram 500 presumes that bi-directional communication is available at least between the first device 100 and the switchboard server 110 and between the second device 120 and the switchboard server 110. Note, however, as further described below, it is not required that the first device 100 and the second device 120 can communicate with one another directly.

The sequence diagram 500 further presumes that an update is available for the second device 120 and that this availability is known to at least the first device 100. The availability of such an update may has been previously detected in a variety of manners such as, for example, by periodic polling by one or more of the first device 100, the switchboard server 110, or the second device 120. For example, one or more of the first device 100, the switchboard server 110, or the second device 120 may periodically poll an update server (not shown) such as may be provided, for example, by a manufacturer of the second device 120. In another example, it may be that a notification that an update is available is received by one or more of the first device 100, the switchboard server 110, or the second device 120 such as for example from such an update server. In yet another example, it may be that updates for various devices including, for example, the second device 120 are maintained by the switchboard server 110 for distribution. The first device 100 may be provided with a notification that an update is available by another computer system such as, for example, from the switchboard server 110, further to the other computer system learning of the availability of the update. Put differently, another machine such as, for example, the switchboard server 110, may send a notification that an update is available for the second device 120 to the first device 100.

A user of the first device 100 may select to initiate the update of the second device 120. For example, a notification of the availability of the update of the second device 120 may be provided to the user by a notification such as by way of, for example, a visual indication (e.g. via the Android™ notification tray), an email, etc. A user may then select to perform such an update of the second device 120. Responsive to such a selection, the first device may send a message 510 indicating that the second device 120 has been selected (at the first device 100) for update to the switchboard server 110. As such, the switchboard server 110 may receive the message 510 from the first device 100. For example, where the switchboard server 110 is or includes a suitably configured instance of the example computing device 300, it may receive an indication of the second device 120 being selected, at the first device 100, for update by way of the communications subsystem 330.

Next, responsive to the message 510, the switchboard server 110 may, as illustrated, send a message 520 to the second device 120. The message 520 may signal the second device 120 to send state information about itself.

State information about the second device 120 may take a variety of forms and may be specific to the nature of the second device. For example, where the second device 120 is a refrigerator, it may indicate whether the compressor is currently running. In another example, where the second device 120 is a washer or a dryer, it may indicate whether a cycle is currently running. In yet another example, where the second device 120 is a vehicle the information may include, for example, whether the car is in motion, whether it is fueled, a battery charge level, and/or whether the engine is running.

The second device 120 may send one or more messages 530 including state information about itself to the switchboard server 110. As such, it may be that the switchboard server 110 may receive state information one or more times from the second device 120. Such state information may, for example, be received by way of the communications subsystem 330 where the switchboard server 110 is or includes a suitably configured instance of the example computing device 300 as suggested above.

It may be that each of the one or more messages 530 is sent responsive to the message 520. For example, the second device 120 may periodically transmit state information to the switchboard server 110. Additionally or alternatively, the switchboard server 110 may periodically send one or more further requests (not shown) akin to the message 520 triggering sending of one or more of the messages 530.

The switchboard server 110 may determine, based on the received state information about the second device 120 that the second device 120 is in a state where it may be considered ready to perform an update. For example, where the switchboard server is or includes a suitably configured instance of the example computing device 300, a determination may be made by the processor 310.

For example, where the second device is a washer/dryer, determining that it is ready for update may include detecting that no cycle is currently underway.

In another example, where the second device is a refrigerator, determining that it is ready for update may include detecting that the compressor is not currently running or that a frost-free freezer is not currently performing a de-icing operation.

In another example, where the second device 120 includes a battery, determining that it is ready for update may include detecting that the battery is of a sufficient charge level or that the device has been connected to mains power. For example, connection of the second device 120 to a charger may be required to ready it for update.

In another example, determining that the second device 120 is ready for update may include a determination that the second device 120 is in a suitable location. For example, where the second device 120 is a vehicle, determining that it is ready for update may include determining that it is parked in a suitable location such as, for example, a lot, a garage, or an owned parking spot.

In another example, where the second device 120 is a component of another device, determining that the second device 120 is ready to perform an update may include determining that that device is not in use. For example, where the second device 120 is a component of a vehicle, determining that the second device 120 is ready to perform an update may include determining that the vehicle is not in use.

It may, as noted above, be the case that the second device 120 is not directly addressable by the switchboard server 110. As such, it may be that the second device 120 communicates periodically with the switchboard server 110 (i.e., polls) to determine whether any messages are pending for it. Accordingly, the message 520 may be sent responsive to such a poll. Additionally or alternatively, the second device 120 may maintain an open connection stream with the switchboard server 110 for use in communicating therebetween. For example, where the switchboard server 110 provides a web services API, the second device 120 may make an HTTP GET request to which the switchboard server 110 later responds when it has a message to communicate to the second device 120. For example, the message 520 may correspond to a response to a such a "hanging GET".

Responsive to the determination that the second device 120 is ready for update, the switchboard server 110 may send a message 540 to the first device 100 indicating that the second device 120 is ready to perform the update. For example, where the switchboard server 110 is or includes a suitably configured instance of the example computing device 300, it may send such an indication using the communications subsystem 330.

Further to the message 540, the first device 100 may determine that the second device 120 should begin performing the update.

For example, the first device 100 may provide a user interface responsive to the message 540 allowing a user to start the update of the second device 120. As such, the first device 100 may determine that the second device 120 should begin performing the update responsive to initiation of the update via such as user interface. Conveniently, in this way, a user may initiate update of the second device 120 without the need to visiting or, potentially, even entering into physical proximity with the second device 120. Instead, the user needs only use the first device 100. Notably, where the first device 100 is a mobile device with wireless connectivity such as, for example, a smartphone, this may even mean that the user can initiate update of the second device 120 from practically any location of their choosing. More particularly, update of the second device 120 is initiated by way of the first device 100, no direction interaction with the second device 120 such by way of any physical interface elements (e.g., buttons, keys, display mounted on the second device 120, etc.) is required to update the second device 120. In other words, as further described below, after update of the second device 120 is initiated as a consequence of an indication sent from the first device 100 to the switchboard server 110, update of the second device 120 will be performed without any direct interaction with the second device 120 (e.g. interaction controls provided on/by the second device 120, etc.). Put differently, the second device 120 is configured to begin performing the update responsive to a corresponding indication without any interaction requiring an operator to attend the second device 120. For example, the update will be triggered without an operator providing any input to the second device 120 by way of a control panel, button, and/or user interface, etc. thereof.

Furthermore, since, as noted above, providing such a user interface may allow a user to initiate an update at a time of their choosing, such a user interface can also allow a user to defer update of the second device 120 until a time the user finds convenient for update, even if the switchboard server 110 considers it ready for update at an earlier time. Allowing a user to deter update of the second device 120 until a time the user finds convenient for update may allow initiation of the update to take into account information unknown to or not considered by the switchboard server 110 such as, for example, that the user intends to use the second device 120 soon and that, therefore, update should be deferred. For example, where the second device 120 is a washer or a dryer, the user may be planning to run a load and may, therefore, want to wait to update the second device 120. In another example, where the second device 120 is a vehicle, the user may be planning to take it out for a drive and may, therefore, want to defer update.

Such a user interface may be the same user interface as was provided to allow the user to select the second device 120 for update. For example, it may be that the user is provided a list of devices available for update via the user interface. The user may then select a device for update and be provided with a visual indication of whether the device is ready for update. Then, upon receipt of the message 540 the user interface may be updated such as, for example, by making an update control such as, for example, a button available such as, for example, by adding such a control available in the user interface or by making an existing update control active (e.g., not "greyed out"). Alternatively, such an update control may be made available in advance but if a user attempts to activate it prematurely they may be provided with an appropriate error and/or other feedback.

As noted above, it may be that the first device 100 is not directly addressable by the switchboard server 110. Accordingly, it may be that techniques similar to those described above in the context of the message 520 are employed. For example, it may be that a connection to the switchboard server 110 is maintained. For example, the message 540 may correspond to a communication over a channel that was opened between the first device 100 and the switchboard server 110 to send communications corresponding to the message 510. In a particular example, the message 510 may correspond to an HTTP GET that is then left hanging until a reply (corresponding to the message 540) is sent.

Upon determining that the second device 120 should begin performing the update, the first device 100 may send a message 550 to the switchboard server 110 indicating that the second device 120 should be updated. As such, the switchboard server 110 may receive the message 550 from the first device 100. For example, where the switchboard server 110 is or includes a suitably configured instance of the example computing device 300, such an indication may be received using the communications subsystem 330.

Responsive to the message 550, the switchboard server 110 may send a message 560 to the second device 120 indicating that the second device 120 should begin performing the update.

Responsive to the message 560, the second device 120 may begin performing the update.

The second device 120 may download the update responsive to the message 560. For example, the second device 120 may download the update from an update server (not shown), either directly or through a relay. For example, the switchboard server 110 may act as a relay. In another example, it may be that the second device 120 will download the update from the switchboard server 110 responsive to the message 560. Alternatively, the second device 120 may have previously downloaded the update. For example, it may be that the second device 120 is configured to automatically download updates such as, for example, during idle periods. It may be that the state information provided by the second device 120 (e.g. in the messages 530) includes a status of any such download. Further, it may be that a determination that the second device 120 is ready for update requires detecting or determining that any pending update has been downloaded.

During the update, the second device 120 may send one or more messages (not shown) indicating one or more of the initiation of the updating process, the progress of the updating process (e.g., periodically), and the completion thereof. Notably, responsive to such messages, the switchboard server 110 may send one or more messages to the first device 100 (not shown) indicating initiation of the updating process, progress of the updating progress (e.g., periodically), and/or completion of the updating progress. Responsive to receiving such messages may provide a user interface indication corresponding to the message. As such, a user may monitor the status of an initiated update including to determine whether such an update has been started, how quickly it is proceeding, and whether it is completed. Conveniently, in this way, a user may determine whether the second device 120 is available for use after update thereof has been initiated without the need to visit or attend the second device 120.

In some embodiments, the first device 100 may also receive an estimate of how long the update will take to complete and/or may determine such an estimate based on received information (e.g., based on progress updates). Conveniently, in this way, a user may determine (by way of the first device 100) when a second device 120 will again be available for use after update thereof has been initiated without the need to attend or visit the second device 120.

In some embodiments, user interface provided by the first device 100 may allow a user to cancel update of the second device 120 after initiation. For example, it may be that update of the second device 120 can be canceled after initiation by way of user interface provided by the first device 100 if the update of the second device 120 not yet started. Additionally or alternatively, it may be that update of the second device 120 can canceled by way of such user interface even after starting such as, for example, where the update process supports rollback of partial updates.

It may be that the update cannot be performed by the second device 120 for various reasons. For example, a failure may occur during applying the update. Additionally or alternatively, it may be that following the second device 120 being determined to be ready to perform the update and before the receipt and handling of the message 560, the second device 120 experiences a state change such that it is no longer ready to perform the update. Accordingly, it may be that a message (not shown) indicating that the update cannot be performed or that the update has failed is sent to the switchboard server 110 responsive to the message 560 and the switchboard server 110 may, in turn, send a corresponding message to the first device 100. A corresponding notification may then be provided to a user by the first device 100. Conveniently, in this way, a user may be informed by way of the first device 100 if update of the second device 120 has failed without the need to attend or visit the second device 120.

It may be that the state information sent by the second device 120 to the switchboard server 110 includes information about whether the second device 120 considers itself to be in a state ready for update. The switchboard server 110 may then defer to the determination of the second device 120 in making its determination as to whether the second device is ready for update or, alternatively, may rely both on that state information and other state information provided by the second device 120 is combination to determine whether the second device 120 is in a condition ready for update based the state information. Conveniently, in this way, considerations ignored by the second device 120 in making its determination may be incorporated into the determination of its readiness for update by the switchboard server 110 while still leveraging the information about whether the second device 120 considers itself to be in a state ready for update. Additionally, it may be that further information is received from other sources that is factored into the determination. For example, it may be that information is received indicating that maintenance has been scheduled for power or communications systems affecting one or more of the first device 100, the switchboard server 110, and second device 120 and that, therefore, it may be necessary or desirable to defer update being as readiness for update may be impacted. Additionally or alternatively, it may be that information is received or obtained indicating that an outage such as, for example, a communications outage is underway. Such an interruption may impact readiness for update. For example, it may be that the update cannot be accessed such as, for example, where it is to be downloaded subsequent to initiation of updating.

It may be that the first device 100 is authenticated by the switchboard server 110 as being authorized to update the second device 120. Authentication information may be sent by the first device 100 to the switchboard server 110. For example, an indication that the second device 120 has been selected for update (e.g. the message 510) may further indicate the authentication information. The switchboard server 110 may condition sending any indication signalling the second device 120 to send state information about the second device 120 to the switchboard server 110 (e.g., the message 520) on the switchboard server 110 determining that the authentication information indicates authorization to update the second device 120. For example, the switchboard server 110 may determine based on the authentication information whether a user associated with the authentication information is authorized to update the second device 120. The switchboard server 110 may communicate with another server such as, for example, an authentication server (not shown) to confirm such authorization.

As noted above, it may be that the first device 100 may provide a user interface whereby a user could attempt to prematurely initiate an update and may receive a corresponding error or explanation. For example, the user may receive an explanation as to why the device is not available for update yet. It may, therefore, be that the switchboard server 110 may transmit one or more periodic updates to the first device 100 following selection of the second device 120 for update and prior to it becoming ready for update providing an explanation and/or allowing determination of an explanation of why the second device 120 may not be considered ready for update.

Figure 6:
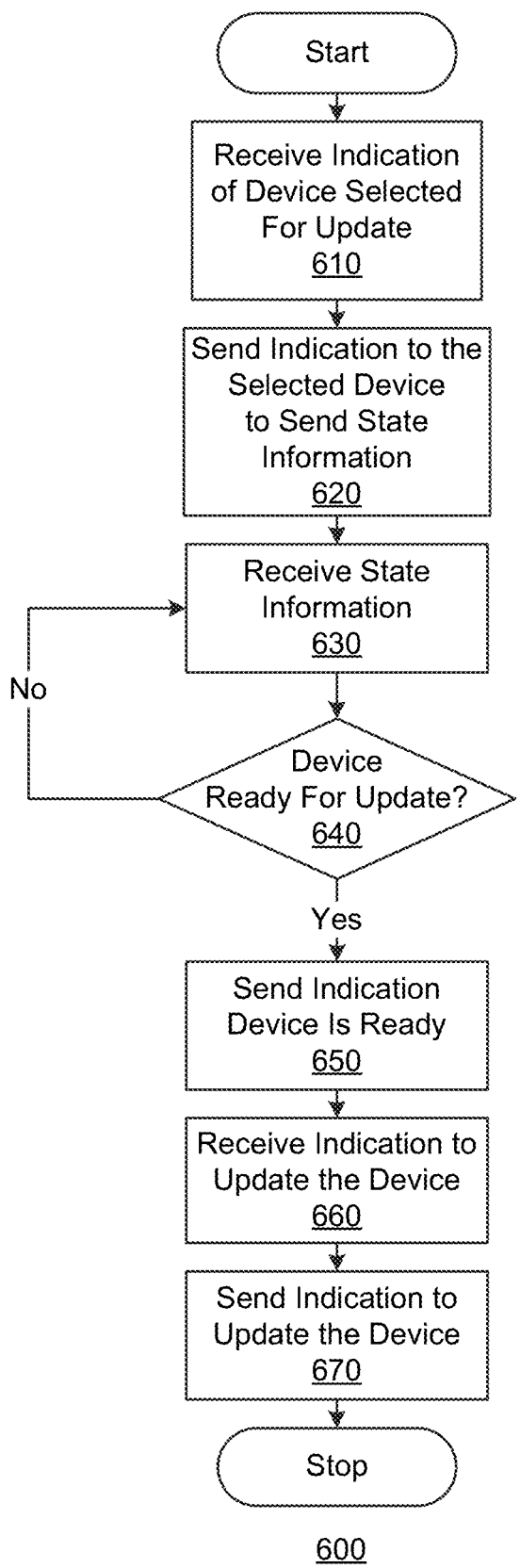
FIG. 6 is a flow chart illustrating an example method of one of the computing devices of FIG. 1.

The operation of the switchboard server 110 in initiating an update of the second device 120 is described with reference to a flowchart 600 of FIG. 6. Operations 610 and onward are performed by one or more processors of a computing device, such as for example the processor 310 of a suitably configured instance of the example computing device 300, executing software such as, for example, a suitable instance of the application 410.

At the operation 610, the switchboard server 110 receives an indication of a device selected for update. For example, it may be that the first device 100 may select from amongst a variety of devices for which it may initiate an update. As such, the switchboard server 110 may receive a message indicating that a particular device to be considered the second device 120. Put differently, the switchboard server 110 may receive an indication such as, for example, the message 510 described above and/or may handle such an indication in manners consistent with the description of the handling of the message 510 above.

From the operation 610, control flow advances to an operation 620. At the operation 620, the switchboard server 110 sends an indication to the selected device—i.e., the second device 120—that it should send state information to the switchboard server 110. For example, the switchboard server may send a message like the message 520 and/or consistent with the description of the sending thereof above.

From the operation 620, control flow advances to an operation 630. At the operation 630, the switchboard server 110 processes an indication of state information received from the selected device. For example, the switchboard server 110 may receive and process a message like one of the messages 530 and/or consistent with the description of the handling thereof above.

From the operation 630, control flow advances to an operation 640. At the operation 640 it is determined whether the selected device is ready for update consistent with manners for determining whether the second device 120 is ready for update as described above.

From the operation 640, if it is determined that the selected device is ready for update, control flow proceeds to an operation 650. Alternatively, if it is determined that the selected device is not ready, control flow returns to the operation 630 to receive and process further state information. For example, control flow may return to process a message like another of the messages 530.

At the operation 650, the switchboard server 110 sends an indication that the selected device is ready to the device from which the indication was received at the operation 610. For example, it may be that the switchboard server 110 sends an indication to the first device 100 such as, for example, a message as may be akin to the message 540 and/or may be generated in manners consistent with the description of the sending of the message 540 above.

From the operation 650, control flow proceeds to an operation 660. Consistent with the description above, it is the selecting device (e.g. the first device 100) that determines when the update of the selected device should be initiated. As described above, this may, for example, allow a user of the selecting device to identify an opportune time for update. Once a determination that the second device should be updated is made, an indication thereof may be sent to the switchboard server 110. Such an indication may then, for example, be received such as by way of a message akin to the message 550 and/or may be processed consistent with the description of handling of the message 550 above.

From the operation 660, control flow proceeds to an operation 670. At the operation 670, the switchboard server 110 sends an indication to the device that it is to begin updating itself consistent with the description of the message 560 (FIG. 5). Such an indication may be, for example, be sent by way of a message akin to the message 560 and/or may be generated in manners consistent with the description of the sending of the message 560 above.

It may be that additional or alternative operations to those illustrated in FIG. 2 are performed by the switchboard server 110. For example, additional or alternative operations may be performed consistent one or more of the variations discussed above as regards FIG. 5.

Further, as discussed above it may be that the first device 100 and the second device 120 are not able to communicate directly via the network 130. A particular example of such a scenario is shown in FIG. 2.

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer system comprising:
   a processor;
   a communications subsystem; and
   a non-transitory computer-readable storage medium storing instructions that when executed by the processor adapt the computer system to:
   receive, from a device for which an update is available, using the communications subsystem, state information about the device;
   determine, by the processor based on the state information about the device for which the update is available, that the device is in a condition where the device is ready to perform the update;
   receive, from another device using the communications subsystem, an indication to update the device for which the update is available; and
   after determining that the device for which the update is available is in a condition to perform the update and receiving the indication to update the device, send, to the device for which the update is available using the communications subsystem, an indication to begin performing the update, wherein the device for which the update is available is configured to begin updating responsive to such an indication without any direct interaction with the device for which the update is available.

2. The computer system of claim 1, wherein the instructions, when executed by the processor, further adapt the computer system to:
   receive, from the device for which the update is available, one or more indications as to a status of the performing of the update; and
   send, to the another device, information about the performing of the update based on the one or more indications.

3. The computer system of claim 1, wherein the state information about the device for which the update is available indicates whether the device is ready to perform the update.

4. The computer system of claim 1, wherein the state information about the device for which the update is available indicates whether the device for which the update is available has downloaded the update.

5. The computer system of claim 1, wherein the device for which the update is available is configured to download the update responsive to the indication to begin performing the update.

6. The computer system of claim 1, wherein the computer system communicates with each of the device for which the update is available and the another device via a network, wherein the device for which the update is available and the another device cannot communicate directly with each other via the network.

7. The computer system of claim 1, wherein the another device is configured to provide a user interface, responsive to the indication that the device for which the update is available is ready to perform the update, for initiating the update of the device for which the update is available and wherein the another device is configured to send the indication to update the device for which the update is available responsive to initiation of the update via the user interface.

8. The computer system of claim 1, wherein the device for which the update is available is a component of a further device and wherein determining that the device for which the update is available is ready to perform the update comprises determining that the further device is not in use.

9. The computer system of claim 1, wherein the instructions when executed by the processor further adapt the computer system to send, to the another device using the communications subsystem, a notification that the update is available for the device for which the update is available.

10. The computer system of claim 9, wherein the instructions when executed by the processor further adapt the computer system to send an indication to the device for which the update is available using the communications subsystem to notify that the update is available.

11. The computer system of claim 10 wherein the device for which the update is available is configured to download the update responsive to the indication that the update is available.

12. The computer system of claim 1, wherein the another device is a smartphone.

13. The computer system of claim 1, wherein the device for which the update is available is included in an Internet-of-Things connected device.

14. A computer-implemented method comprising:
    receiving, from a device for which an update is available, state information about the device;

determining, based on the state information about the device for which the update is available, that the device is in a condition where the device is ready to perform the update;

receiving, from another device, an indication to update the device for which the update is available; and after determining that the device for which the update is available is in a condition to perform the update and receiving the indication to update the device, send, to the device for which the update is available, an indication to begin performing the update, wherein the device for which the update is available is configured to begin updating responsive to such an indication without any direct interaction with the device for which the update is available.

15. The method of claim 14, further comprising:

receiving, from the device for which the update is available, one or more indications as to a status of the performing of the update; and sending, to the another device, information about the performing of the update based on the one or more indications.

16. The method of claim 14, wherein the state information about the device for which the update is available indicates whether the device is ready to perform the update.

17. The method of claim 14, wherein the state information about the device for which the update is available indicates whether the device for which the update is available has downloaded the update.

18. The method of claim 14, wherein the device for which the update is available is configured to download the update responsive to the indication to begin performing the update.

19. The method of claim 14, wherein the another device is configured to provide a user interface, responsive to the indication that the device for which the update is available is ready to perform the update, for initiating the update of the device for which the update is available and wherein the another device is configured to send the indication to update the device for which the update is available responsive to initiation of the update via the user interface.

20. A non-transitory computer-readable storage medium storing instructions that when executed by a processor of a computer system adapt the computer system to:

receive, from a device for which an update is available, state information about the device;

determine, based on the state information about the device for which the update is available, that the device is in a condition where the device is ready to perform the update;

receive, from another device, an indication to update the device for which the update is available; and after determining that the device for which the update is available is in a condition to perform the update and receiving the indication to update the device, send, to the device, an indication to begin performing the update, wherein the device for which the update is available is configured to begin updating responsive to such an indication without any direct interaction with the device for which the update is available.

* * * * *